United States Patent [19]

Bartee

[11] Patent Number: 4,958,047
[45] Date of Patent: Sep. 18, 1990

[54] MONUMENT FITTING

[75] Inventor: Edward C. Bartee, Fairfield, Ohio

[73] Assignee: Square D Company, Palatine, Ill.

[21] Appl. No.: 296,631

[22] Filed: Jan. 13, 1989

[51] Int. Cl.$^5$ ............................................. H02G 3/08
[52] U.S. Cl. ................................................... 174/48
[58] Field of Search ...................... 174/48, 49; 52/221

[56] References Cited

U.S. PATENT DOCUMENTS

| | | | |
|---|---|---|---|
| 2,738,892 | 3/1956 | Wiesmann | 220/3.3 |
| 3,047,650 | 7/1962 | Reiland | 174/49 |
| 3,895,178 | 7/1975 | Huibrechste | 174/48 |
| 3,960,430 | 6/1976 | Bunnell et al. | 339/97 C |
| 3,965,629 | 6/1976 | Pearson | 174/48 X |
| 4,178,469 | 12/1979 | Fork | 174/48 |
| 4,240,688 | 12/1980 | Sotolongo | 339/122 F |
| 4,289,370 | 9/1981 | Storck | 339/125 R |
| 4,323,723 | 4/1982 | Fork et al. | 174/48 |
| 4,387,949 | 6/1983 | Haitmanek | 339/125 R |
| 4,470,656 | 9/1984 | Moser et al. | 339/122 F |
| 4,599,484 | 7/1986 | Bramwell | 174/52 R |

*Primary Examiner*—Leo P. Picard
*Assistant Examiner*—David Tone
*Attorney, Agent, or Firm*—Larry I. Golden; Jose W. Jimenez

[57] ABSTRACT

A monument fitting for use with an electrical raceway system to be placed in a floor provides for alternative selection of top or side access. The monument fitting provides openings permitting either top or side access, and an electrical outlet placed in the openings can be relocated after the monument fitting has been placed in service.

13 Claims, 3 Drawing Sheets

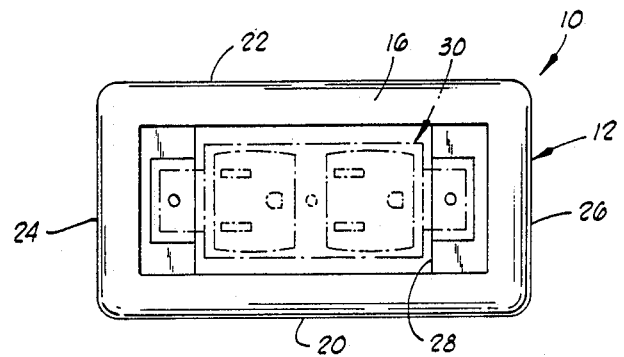
FIG. 1
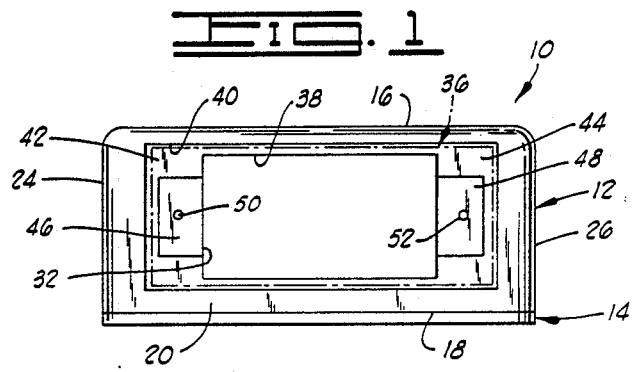
FIG. 2
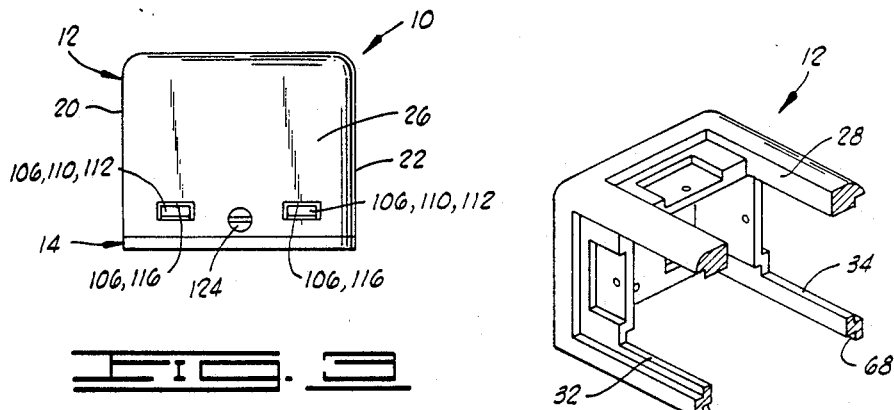
FIG. 3
FIG. 4

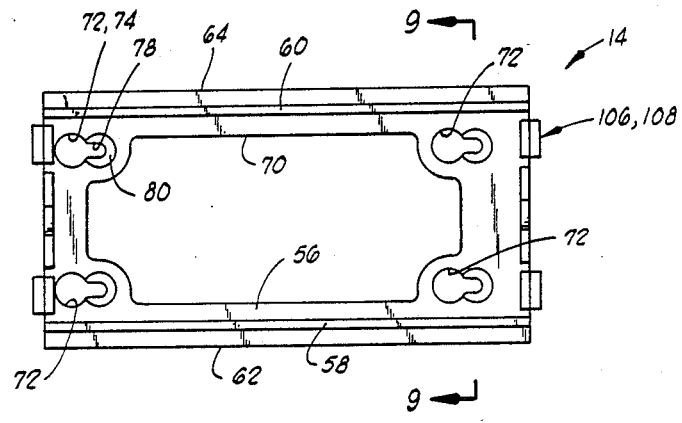
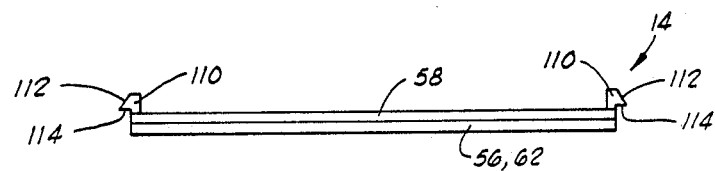
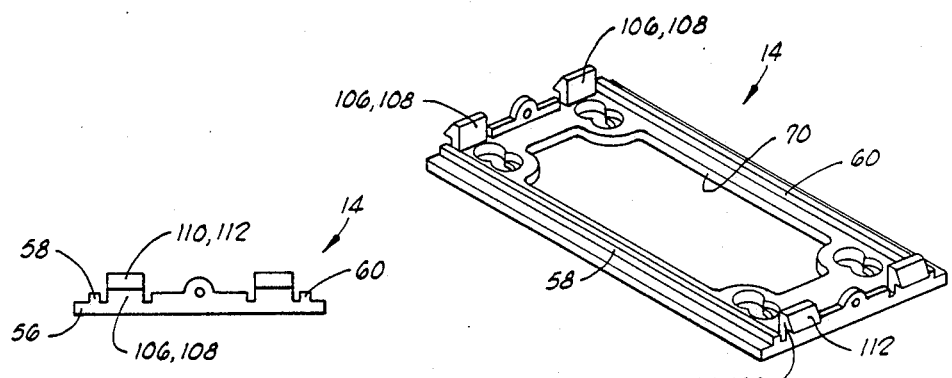
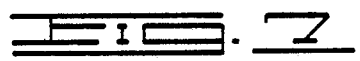
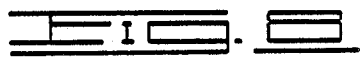

MONUMENT FITTING

This invention relates generally to monument fittings for use with an electrical raceway system designed to be placed in a floor.

BACKGROUND OF THE INVENTION

There are several well known types of electrical raceway systems which are designed to be placed in a floor. There are for example "underfloor raceways" as defined in Article 354 of the National Electrical Code and "cellular metal floor raceways" as defined in Article 356 of the National Electrical Code.

Monument fittings designed for use in either of the two mentioned raceway systems, and conceivably in some other systems, can generally be referred to as monument fittings for use with a raceway system designed to be placed in a floor. It should be noted that when the monument fitting is referred to as a monument fitting for an electrical raceway system to be placed in a floor, it is the raceway system which is placed in the floor, not the monument fitting.

As used herein the simple term "duct" or "raceway", or the phrase "raceway system for placement in a floor" or the like are intended to refer in a generic sense to an "underfloor raceway" or to a "cellular metal floor raceway" or both. Where the term "underfloor duct" or "underfloor raceway" is used it is intended as a reference to the particular type of system defined in Article 354 of the National Electrical Code.

The monument fitting disclosed in this application is designed primarily for use with an underfloor duct for use as part of an underfloor raceway, and is illustrated and described as such herein. It can, however, be used as part of a cellular metal floor raceway system and thus is generically referred to as a monument fitting for an electrical raceway system to be placed in a floor.

Underfloor duct is an electrical raceway system designed to be imbedded in the concrete floor of offices, classrooms, laboratories, manufacturing areas, supermarkets, etc., for the purpose of providing an enclosed raceway for wires and cables from their originating panel to their point of use. Such an underfloor raceway system includes two types of ducts, namely feeder ducts and distribution ducts. Complementing these two types of ducts are junction boxes, support couplers and supports, horizontal and vertical elbows, power and telephone outlets and numerous cast and sheet metal fittings such as conduit adapters, change of direction duct runs, "Y" take-offs, etc.

Typical monument fittings designed for use with such underfloor ducts, include a rigid framework which mounts at the floor level and is communicated with the underfloor duct through a vertical extension of the duct. The rigid monument fitting framework has an opening in which a service fitting such as a power outlet, telephone outlet, or computer outlet is connected. Typical prior art monument fittings are designed solely to provide side access or top access. None of the prior art monument fittings have provided the capability within a single framework of selectively arranging the electrical devices contained therein for either top or side access.

A typical example of a prior art monument fitting designed for side access is shown in U.S. Pat. No. 3,514,525 to Flachbarth et al.

SUMMARY OF THE INVENTION

The present invention provides an improved monument fitting which can have electrical outlets fitted therein for either top access or side access.

The monument fitting includes a frame having a bottom adapted to be mounted approximately at a floor level. At least one top electrical outlet mounting opening is defined in the frame for mounting an electrical outlet therein for top access. At least one, and preferably two, side electrical outlet mounting openings are defined in the frame for mounting side electrical outlets therein for side access at an elevation above the floor level and below the top of the monument fitting frame.

A base is provided for mounting the bottom of the frame approximately at a floor level. Resilient snap-in connectors are provided on the base for connecting the base to the frame.

Numerous objects, features and advantages of the present invention will be readily apparent to those skilled in the art upon a reading of the following disclosure when taken in conjunction with the accompanying drawings.

BRIEF DESCRIPTION OF THE DRAWINGS

FIG. 1 is a plan view of the monument fitting of the present invention showing in phantom lines an electrical outlet in place for top access.

FIG. 2 is a front elevation view of the monument fitting of FIG. 1 showing in phantom lines a cover plate in place within a side opening of the monument fitting covering a side access position.

FIG. 3 is a right end elevation view of the monument fitting of FIG. 1.

FIG. 4 is an isometric sectioned view of the frame of the monument fitting of FIG. 1 separated from the base thereof.

FIG. 5 is a plan view of the base of the monument fitting of FIG. 1.

FIG. 6 is a front elevation view of the base of FIG. 5.

FIG. 7 is a right end elevation view of the base of FIG. 5.

FIG. 8 is an isometric view of the base of FIG. 5.

DETAILED DESCRIPTION OF THE PREFERRED EMBODIMENTS

Figure 9:
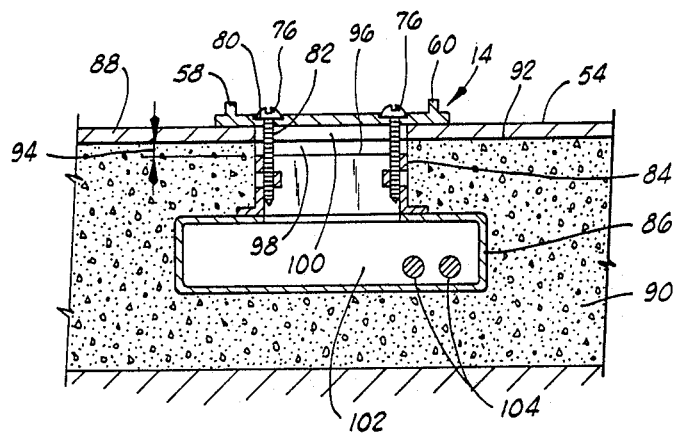
FIG. 9 is a sectioned elevation view such as would be taken along line 9—9 of FIG. 5, showing the base of FIG. 5 mounted at a floor level and connected to a preset extension of an underfloor duct. The frame has not yet been attached to the base in FIG. 9.

Referring now to the drawings and particularly to FIGS. 1-3, a monument fitting is thereshown and generally designated by the numeral 10. The monument fitting 10 includes a frame 12 and a base 14.

The frame 12 can generally be described as an elongated, rectangular, parallelepiped frame 12 having a top 16, an open bottom 18, longer first and second sides 20 and 22 and shorter third and fourth sides 24 and 26.

The top 16 has a first electrical outlet mounting means 28 defined therein for mounting an electrical outlet such as shown in phantom lines and designated by the numeral 30 for top access thereto. The outlet 30 illustrated is a conventional duplex electrical power outlet.

The first and second longer sides 20 and 22 similarly have second and third electrical outlet mounting means 32 and 34, respectively, defined therein for mounting electrical outlets such as 30 for side access thereto.

It will be understood by those skilled in the art that electrical outlets for use in mounting means 28, 32 and 34, may be electrical power outlets, electrical telephone outlets, electrical computer outlet connections, or other commonly used electrical devices, all of which can generally be referred to as electrical outlets.

The frame 12 is dimensioned so that when one electrical outlet is mounted in the first mounting means 28 for top access thereto, said one electrical outlet prevents other electrical outlets from being mounted in the second and third mounting means 32 and 34. The frame 12 is also dimensioned so that if the first mounting means 28 is empty, electrical outlets such as the outlet 30 can be mounted in both the second and third mounting means 32 and 34 for side access.

In a monument fitting designed to be permanently located above the floor level, dimensions are critical as it is desired to make these fittings as small as possible and to maintain as low a profile as possible. Typically a top access mounting fitting permits the lowest possible profile, but side access monument fittings are often preferred and are in fact the most commonly used. The construction of monument fitting 10, and particularly the dimensioning thereof just described provides a very low profile, relatively small monument fitting 10 which additionally provides the alternative of either top access or side access mounting of electrical outlets.

Those mounting means 28, 32 or 34 which do not have electrical outlets mounted therein will typically be covered by a blank cover plate such as indicated in phantom lines and designated by the numeral 36 in FIG. 2.

With the arrangement of electrical outlet mounting means 28, 32 and 34 in the frame 12, means is provided for permitting electrical outlets to be relocated between top and side access positions after the monument fitting 10 is placed in service.

Each of the electrical outlet mounting means such as mounting means 32 shown in FIG. 2 includes a rectangular opening 38 through which wiring 104 (see FIG. 9) can be accessed and into which an electrical outlet such as electrical outlet 30 can extend. The rectangular opening 38 is surrounded by a rectangular recess 40. The recess 40 defines two generally planar recessed surfaces 42 and 44 at opposite ends thereof. Within each of the planar recessed surfaces 42 and 44 are further recessed surfaces 46 and 48, respectively. Small circular holes 50 and 52 are defined in the further recessed surfaces 46 and 48, respectively, for receiving a mounting screw for mounting the electrical outlet 30 or cover plate 36.

The base 14, which is best seen in FIGS. 5-8, provides a means for mounting the bottom 18 of the frame 12 at approximately a floor level 54 (see FIG. 9).

The base 14 generally includes a flat plate portion 56 having two parallel ribs 58 and 60 extending parallel to and slightly spaced inward from longer sides 62 and 64 of base 14. The ribs 58 and 60 fit within longitudinal notches 66 and 68, respectively (see FIG. 4) defined in the bottom 18 of frame 12.

The plate 56 of base 14 has an opening 70 defined in the central portion thereof through which electrical cables 104 may be pulled.

Four key-shaped openings 72 are defined in corners of the plate 56. The key-shaped openings 72 include larger, generally circular portions 74 through which a head of threaded fastener 76 (see FIG. 9) may fit, and smaller necked-down portions 78 surrounded by generally circular recesses 80. A shaft 82 (see FIG. 9) of threaded fastener 76 may be received through the necked-down portion 78 with the head of the fastener 76 resting on the recessed surface 80.

With this arrangement, four threaded fasteners 76 can be attached to a preset extension 84 which itself is fixedly mounted on the top of an underfloor duct 86, in a pattern generally corresponding to the location of the four large openings 74. The heads of the fasteners 76 may then be inserted through the enlarged portion 74 and the base 14 then moved a short distance horizontally so that the heads of the fasteners 76 are located above the circular recesses 80. Then the fasteners 76 may be tightened as shown in FIG. 9 to hold the base 14 in place on the top level 54 of a floor covering such as 88.

In FIG. 9, the underfloor duct 86 is shown imbedded in a cement floor 90. A top level 92 of the cement 90 extends a short distance 94 above a top level 96 of the preset extension 84. This relatively thin layer 94 of cement located immediately above the preset extension 84 has been broken out as indicated at 98. The floor covering 92 has also been cut away as at 100, to provide access down through the preset extension 84 into an interior 102 of underfloor duct 86 within which a plurality of cables such as 104 will be located.

As previously noted, the underfloor duct 86 may be more generally described as an electrical raceway system 86 located in a floor 90. As also previously mentioned, the monument fitting 10 can also be utilized with other types of raceway systems designed to be placed in a floor, such as in raceway systems designed for use with cellular metal flooring.

The monument fitting 10 further includes a resilient snap-in connector means 106 operably associated with the base 14 and the frame 12 for connecting the base 14 to the frame 12.

The connector means 106 includes a plurality of vertically upward extending resilient legs 108 each attached to the base 14 and each including a lug 110 having an upward facing tapered cam surface 112 and a downward facing locking surface 114 defined thereon. The lug 110 and surfaces 112 and 114 are best seen in the elevation view of FIG. 6.

The connector means 106 further includes a plurality of locking recesses 116 defined therein, one of which recesses 116 is associated with each of the lugs 110.

The legs 108 and recesses 116 of connector means 106 are so arranged and constructed that when the frame 12 is pressed downward over the base 14, the lugs 110 snap into the recesses 106 as is best seen in FIG. 3. It will be appreciated that as the frame 12 is pressed downward over the base 14, the bottom 18 of frame 12 will engage the tapered cam surfaces 112 thus biasing the legs 108 inward until the downward facing locking surfaces 114 are located above and then snapped outward into the recesses 116.

Preferably, all of the features of the frame 12 illustrated in FIGS. 1-4 are provided by injection molding the frame 12 as one integral piece having the various surfaces illustrated. Similarly, the base 14 is preferably constructed by injection molding the same so that all of the features thereof illustrated in FIGS. 5-8 are integrally formed in one molded piece.

The monument fitting 10 will generally be utilized in the following manner.

Referring to FIG. 9, the underfloor duct 86 will be set in place in the concrete floor 90 with a plurality of preset extensions 84 attached thereto and covered by cover plates (not shown). The preset extensions 84 will be covered by a thin layer 94 of concrete as previously mentioned.

When it is desired to locate a service fitting such as the monument fitting 10 at the floor level 54, an appropriate one of the preset extensions 84 will be located, and then the floor covering 88 will be cut away as indicated at 100, and the thin layer of covering concrete 94 will be broken away as indicated at 98 in order to reach the top of the preset extension 84. The cover plate (not shown) which is initially placed in the preset extension 84 will then be removed so that cables 104 located within the underfloor duct 86 can be accessed.

The base 14 will then be mounted in place on top of the floor covering 88 with four threaded connectors 76 as previously described.

The cables 104 will be pulled through the opening 70 of the base 14, and will then be inserted through one of the openings 38 corresponding to one or more of the electrical outlet mounting means 28, 32 or 34 which is to be utilized.

The cables 104 will then be attached to an electrical outlet such as 30 in a well known manner. The outlet 30 will then be mounted within the housing 12 as generally indicated in FIG. 2. Again, it is understood that either one electrical outlet 30 can be mounted in the top access position 28, or one or two electrical outlets 30 can be mounted in the side access positions 32 and 34.

Then, the frame 12 is mounted on the base 14 by snapping it in place as previously described. Screws 124 (see FIG. 3) can also be used to further secure frame 12 to base 14.

Any outlet placed in one of the side access positions 32 or 34 will be located at an elevation above floor level 54 and below the elevation of top 16 of frame 12.

It will be appreciated that the steps just described could be to some extent performed in a different order. For example, the frame 14 could be snapped in place on the base 12 before the electrical outlets 30 were wired or mounted into the frame 14.

With the monument fitting 10 of the present invention, the same can originally be assembled for either top or side access thereto as is initially desired by the architect or other person who is specifying the construction of the electrical system of the building.

If, as is often the case, the need arises for changing the monument fitting from top access to side access or vice versa, the monument fitting 10 permits such as change to be readily made without removing and replacing the monument fitting itself as must currently be done.

This can be accomplished simply by removing the electrical outlet which was initially installed, installing a cover plate over the opening where the electrical outlet was initially located, and then re-installing that electrical outlet or another outlet in another one of the openings in the frame 12.

Figure 10:
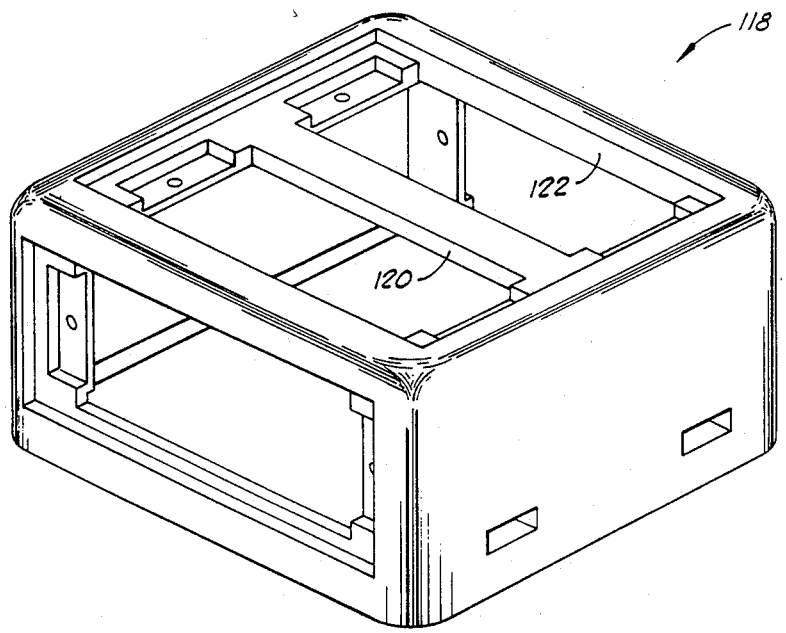
FIG. 10 is an isometric view of an alternative embodiment of the frame. The frame of FIG. 10 is approximately twice the size of the frame of FIG. 5 and is constructed to receive two electrical devices in the top access position.

FIG. 10 illustrates an alternative embodiment 118 of a frame. The frame 118 is similar to the frame 12 except that it is larger in plan view and has two openings like the top opening 28 of frame 12, located side by side. The two top openings of frame 118 are designated by the numerals 120 and 122. Although not shown in FIG. 10, the frame 118 is utilized with a modified base (not shown) constructed generally like the base 14 but being larger in shape so as to correspond generally to the plan dimensions of frame 118. A monument fitting using the larger frame 118 of FIG. 10 will otherwise be constructed similar to monument fitting 10 and used in the same general manner.

Thus it is seen that the apparatus and methods of the present invention readily achieve the ends and advantages mentioned, as well as those inherent therein. While certain preferred embodiments have been illustrated and described for purposes of the present disclosure, numerous changes in the arrangement and construction of parts may be made by those skilled in the art, which changes are encompassed within the scope and spirit of the invention as defined by the appended claims.

What is claimed is:

1. A monument fitting apparatus for an electrical raceway system to be placed in a floor, comprising:
   an elongated, rectangular parallelepiped frame having a top, a bottom, longer first and second sides, and shorter third and fourth sides;
   said top having a first electrical outlet mounting means defined therein for mounting an electrical outlet for top access thereto;
   said first and second longer sides having second and third electrical outlet mounting means defined therein, respectively, for mounting electrical outlets for side access thereto;
   wherein said frame is dimensioned so that when one electrical outlet is mounted in said first mounting means for top access said one electrical outlet prevents other electrical outlets from being mounted in said second and third mounting means, and when said first mounting means is empty electrical outlets can be mounted in both of said second and third mounting means for side access; and
   wherein said first, second and third mounting means are further characterized as providing a means for permitting electrical outlets to be relocated between top and side access positions after said monument fitting apparatus is placed in service.

2. The apparatus of claim 1, wherein:
   said first, second and third mounting means are each suitable for selectively mounting telephone jacks, computer cabling or duplex electrical power outlets.

3. The apparatus of claim 1, further comprising:
   a base means for mounting said bottom of said frame at approximately a floor level.

4. The apparatus of claim 3, further comprising:
   resilient snap-in connector means, operably associated with said base means and said frame, for connecting said base means to said frame.

5. The apparatus of claim 4, wherein said connector means includes:
   a plurality of vertically upward extending resilient legs attached to said base means, each of said legs including a lug having an upward facing tapered cam surface and a downward facing locking surface defined thereon;
   a plurality of locking recesses defined in said frame, one of said recesses being associated with each of said legs; and
   wherein said legs and said recesses are so arranged and constructed that when said frame is pressed downward over said base means, said lugs snap into said recesses.

6. A monument fitting apparatus for an electrical raceway system to be placed in a floor, comprising:
- a frame having a bottom adapted to be mounted at approximately floor level;
- at least one top electrical outlet mounting means, defined on said frame, for mounting a top electrical outlet therein for top access at a top elevation above said floor level; and
- at least one side electrical outlet mounting means defined on said frame, for mounting a side electrical outlet therein for side access at an elevation above said floor level and below said top elevation.

7. The apparatus of claim 6, wherein said top mounting means and side mounting means are further characterized as a means for permitting electrical outlets to be relocated between top and side access positions after said monument fitting apparatus is placed in service.

8. The apparatus of claim 6, wherein:
- said frame has one and only one of said top electrical outlet mounting means defined thereon;
- said frame has two and only two of said side electrical outlet mounting means defined thereon on opposite sides of said top electrical outlet mounting means; and
- said frame is dimensioned so that when said top electrical outlet is mounted in said top electrical outlet mounting means said top electrical outlet prevents said side electrical outlets from being mounted in either of said two side electrical outlet mounting means, and when said top electrical outlet mounting means is empty said side electrical outlets can be mounted in both of said side electrical outlet mounting means.

9. The apparatus of claim 6, further comprising:
- a base means for mounting said bottom of said frame at approximately said floor level.

10. The apparatus of claim 9, further comprising:
- resilient snap-in connector means, operably associated with said base means and said frame, for connecting said base means to said frame.

11. The apparatus of claim 10, wherein said connector means includes:
- a plurality of vertically upward extending resilient legs attached to said base means, each of said legs including a lug having an upward facing tapered cam surface and a downward facing locking surface defined thereon;
- a plurality of locking recesses defined in said frame, one of said recesses being associated with each of said legs; and
- wherein said legs and said recesses are so arranged and constructed that when said frame is pressed downward over said base means, said lugs snap into said recesses.

12. A method of changing a monument fitting, of an electrical raceway system located in a floor, between a top access position and a side access position, said method comprising steps of:
- (a) providing a monument fitting including a frame having at least one top access opening and at least one side access opening defined therein;
- (b) removing an electrical outlet from one of said top and said side access openings;
- (c) installing a cover plate over said one opening; and
- (d) installing an electrical outlet in the other of said top and side access openings.

13. The method of claim 12, wherein:
- the electrical outlet installed in step (d) is the same electrical outlet which was removed in step (b).

* * * * *